(12) United States Patent
Fujii

(10) Patent No.: US 10,928,667 B2
(45) Date of Patent: Feb. 23, 2021

(54) TRANSPARENT SUBSTRATE HAVING LIGHT BLOCKING REGION AND DISPLAY DEVICE

(71) Applicant: AGC Inc., Chiyoda-ku (JP)

(72) Inventor: Kensuke Fujii, Tokyo (JP)

(73) Assignee: AGC Inc., Chiyoda-ku (JP)

( * ) Notice: Subject to any disclaimer, the term of this patent is extended or adjusted under 35 U.S.C. 154(b) by 0 days.

(21) Appl. No.: 16/432,436

(22) Filed: Jun. 5, 2019

(65) Prior Publication Data

US 2019/0285934 A1  Sep. 19, 2019

Related U.S. Application Data

(63) Continuation of application No. PCT/JP2017/043619, filed on Dec. 5, 2017.

(30) Foreign Application Priority Data

Dec. 8, 2016  (JP) .............................. JP2016-238840

(51) Int. Cl.
*G02F 1/1335* (2006.01)
*G02B 5/22* (2006.01)
(Continued)

(52) U.S. Cl.
CPC .......... *G02F 1/133512* (2013.01); *G02B 1/11* (2013.01); *G02B 5/22* (2013.01); *G02F 1/1333* (2013.01); *G02F 1/1335* (2013.01)

(58) Field of Classification Search
CPC ................................................ G02F 1/133512
See application file for complete search history.

(56) References Cited

U.S. PATENT DOCUMENTS 5,794,777 A * 8/1998 Akao ..................... G03B 17/30
                                                         206/409
2008/0318018 A1* 12/2008 Segawa .................. G02B 5/003
                                                         428/220

(Continued)

FOREIGN PATENT DOCUMENTS

CN  103597533 A  2/2014
JP  2014-99159  5/2014

OTHER PUBLICATIONS

International Search Report dated Feb. 27, 2018 in PCT/JP2017/043619 filed Dec. 5, 2017 (with English Translation).

(Continued)

*Primary Examiner* — Edmond C Lau
(74) *Attorney, Agent, or Firm* — Oblon, McClelland, Maier & Neustadt, L.L.P.

(57) ABSTRACT

A transparent substrate with a light shielding region includes a transparent substrate, and a light shielding region on a peripheral portion of one main surface of the transparent substrate. The light shielding region includes a first light shielding region and a second light shielding region. The first light shielding region has a luminous transmittance of 0.1 to 40%, and an average transmittance at a wavelength of 800 to 1,000 nm of 65% or more. The second light shielding region has an optical density of 4 or more. The second light shielding region has a luminous reflectance of 0.1 to 1% and an average reflectance $R_1$ at a wavelength of 600 to 700 nm being 1.5 times or more of an average reflectance $R_2$ at a wavelength of 400 to 600 nm of the second light shielding region.

20 Claims, 2 Drawing Sheets

(51) Int. Cl.
  *G02F 1/1333* (2006.01)
  *G02B 1/11* (2015.01)

(56) References Cited

U.S. PATENT DOCUMENTS

2009/0179880 A1* 7/2009 Nakajima ......... G02F 1/133514
                                                    345/207
2019/0107649 A1* 4/2019 Ikegami ................ G02B 1/18

OTHER PUBLICATIONS

Written Opinion dated Feb. 27, 2018 in PCT/JP2017/043619 filed Dec. 5, 2017.

* cited by examiner

TRANSPARENT SUBSTRATE HAVING LIGHT BLOCKING REGION AND DISPLAY DEVICE

TECHNICAL FIELD

The present invention relates to a transparent substrate with a light shielding region, and a display device including the transparent substrate with a light shielding region.

BACKGROUND ART

A front plate for protecting a display surface is provided in a display device which has high functionality. The front plate includes a region which transmits light from the display surface and a light shielding region which does not transmit light in a region surrounding the display surface.

One kind of display device has a display panel and a sensor which receives operation light such as infrared rays from a remote controller. In such a display device, the sensor is disposed in a back surface of the light shielding region. It is therefore necessary to allow a part of the light shielding region to transmit the operation light such as infrared rays.

However, when a region which transmits infrared rays and a region which does not transmit infrared rays are made of different materials in order to allow a part of the light shielding region to transmit the operation light such as infrared rays, a boundary is formed in the single light shielding region. Thus, there is a problem that the display device deteriorates in designability when the boundary is conspicuous.

CITATION LIST

Patent Literature

Patent Literature 1: JP-A-2014-99159

SUMMARY OF INVENTION

Technical Problem

In recent years, any display device is required to have high designability. That is, the display device is required to have high designability together with functionality in a front plate of the display device. To this end, a transparent substrate used as the front plate and having a light shielding region is required to have an infrared transmission region and an infrared non-transmission region in the light shielding region and it is required to prevent the boundary between those regions from being visually recognized. An object of the present invention is to provide such a transparent substrate with a light shielding region as described above.

Solution to Problem

The transparent substrate with a light shielding region in the present invention is a transparent substrate with a light shielding region, including a transparent substrate, and a light shielding region on a peripheral portion of one main surface of the transparent substrate, wherein:

the light shielding region includes a first light shielding region and a second light shielding region;

the first light shielding region has a luminous transmittance of 0.1 to 40%, and an average transmittance at a wavelength of 800 to 1,000 nm of 65% or more, wherein the luminous transmittance and the average transmittance are determined through measurement from the other main surface of the transparent substrate;

the second light shielding region has an optical density of 4 or more; and the second light shielding region has a luminous reflectance of 0.1 to 1 and an average reflectance $R_1$ at a wavelength of 600 to 700 nm being 1.5 times or more of an average reflectance $R_2$ at a wavelength of 400 to 600 nm of the second light shielding region, wherein the luminous reflectance, the average reflectance $R_1$ and the average reflectance $R_2$ are determined through measurement from the other main surface of the transparent substrate and are determined after excluding surface reflection on the other main surface of the transparent substrate.

Advantageous Effects of Invention

In the a transparent substrate with a light shielding region in the present invention, a first light shielding region and a second light shielding region are included, but the boundary between those regions can be made unclear when the transparent substrate is used as a front plate. As a result, it is possible to provide a display device with high designability.

DESCRIPTION OF EMBODIMENTS

An embodiment of the present invention is described. In the following description, unless otherwise specifically noted, a visible light region means light whose wavelength is within a range of from 380 nm to 780 nm, and an infrared region means light whose wavelength is 800 nm or more. Visible transmittance and visible reflectance mean average transmittance and average reflectance weighted by visibility and light intensity of a light source at a measured wavelength range of from 380 nm to 780 nm. The visible transmittance and the visible reflectance can be measured in accordance with JIS Z 8701 (1999). Average transmittance and average reflectance mean average values of transmittance and reflectance, respectively, determined at a measured wavelength range of from 800 nm to 1,000 nm. The average transmittance and the average reflectance can be measured in accordance with JIS Z 8722 (2009). A haze value is a value defined in JIS K 7136 (2000). In the description of a transparent substrate with a light shielding layer, a main surface of the transparent substrate where a light shielding region is provided is referred to as a back side, and a main surface of the transparent substrate where the light shielding region is not provided is referred to as a front side.

(Transparent Substrate with Light Shielding Region)

A transparent substrate with a light shielding region in the present embodiment is described with reference to FIG. 1 and FIG. 2A.

Figure 1:
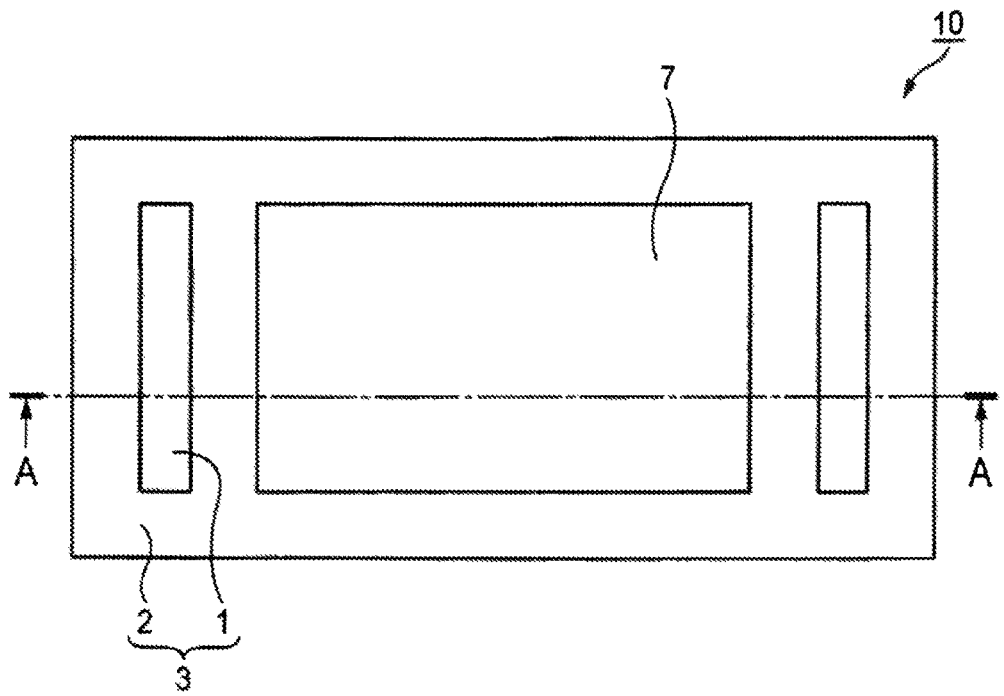
FIG. 1 is a plan view of a transparent substrate with a light shielding region in the present embodiment.

FIG. 1 is a schematic plan view of a transparent substrate 10 with a light shielding region in the present embodiment. FIG. 2A is a sectional view of the transparent substrate 10 with a light shielding region in the present embodiment, taken on line A-A in FIG. 1. As shown in FIG. 1 and FIG. 2A, the transparent substrate 10 with a light shielding region in the present embodiment includes a light transmitting region 7 and a light shielding region 3. The light shielding region 3 is provided on one main surface of the transparent substrate 4 so as to surround the light transmitting region 7. The light shielding region 3 includes a first light shielding region 1 and a second light shielding region 2.

(Light Shielding Region 3)

In the present embodiment, the light shielding region 3 includes the first light shielding region 1 and the second light shielding region 2. In the present embodiment, the first light shielding region 1 includes a first light shielding layer 5, and the second light shielding region 2 includes a stack of the first light shielding layer 5 and a second light shielding layer 6.

In the present embodiment, the first light shielding region 1 transmits light whose wavelength is within the infrared region, but the second light shielding region 2 does not transmit light whose wavelength is within the infrared region, as is described below. As a result, when the transparent substrate 10 with a light shielding region is used as a front plate of a display panel and a sensor for receiving infrared rays (hereinafter referred to as a sensor simply), the sensor can receive infrared rays transmitted through the first light shielding region 1 of the transparent substrate, in a position on the back side of the first light shielding region 1 in the light shielding region 3. On the other hand, visible light and infrared rays can be shielded sufficiently in the second light shielding region 2. Thus, light of any wavelength causing a noise for the sensor can be shielded. In the present description, the phrase "not transmit" means a light shielding property having an optical density of 3.5 or more, which is described below. There is a case where the transparent substrate 10 with a light shielding region in the present embodiment is used as a front plate of a display device, and a liquid crystal panel is used as a display panel which is a constituent member of the display device. In this case, a backlight is mounted on a back surface of the liquid crystal panel. When the optical density is 3.5 or more, a sufficient light shielding property can be ensured to prevent leakage of light from the backlight. Thus, visibility can be ensured in the display device.

The light shielding region 3 is formed in a peripheral portion of a main surface of the transparent substrate 4 so as to form the light transmitting region 7 in the transparent substrate 4. The light shielding region 3 is preferably provided in a region having a width of larger than 0 mm and smaller than 30 mm from an outer periphery of the main surface of the transparent substrate 4. In this manner, the light transmitting region 7 can be widened in the transparent substrate 4. In addition, the light shielding region 3 is narrowed so that designability can be enhanced.

In addition, in the present embodiment, it is preferable that a ratio of the area of the first light shielding region 1 to the area of the light shielding region 3 is 5 to 40%, the areas of the first light shielding region 1 and light shielding region 3 being determined through measurement from the main surface side where the light shielding region 3 is provided. When the ratio is not less than the lower limit, excellent sensor sensitivity can be obtained. When the ratio is not more than the upper limit, a malfunction of the sensor caused by stray light or the like can be prevented.

(First Light Shielding Region 1)

In the present embodiment, the first light shielding region 1 has a visible transmittance of 0.1 to 40% and an average transmittance at a wavelength of 800 to 1,000 nm of 65% or more, the visible transmittance and the average transmittance being determined through measurement from a main surface (the other main surface) of the transparent substrate where the light shielding region is not provided.

Since the visible transmittance of the first light shielding region 1 is a low value ranging from 0.1% to 40%, some degree of light shielding performance is provided even in the first light shielding region 1. Thus, light causing noise, that is, light other than the infrared region can be shielded. The aforementioned visible transmittance is preferably 0.2 to 40%, more preferably 10 to 30%, and further more preferably 15 to 20%. It is preferable that the visible transmittance is 30% or less in order to enhance the light shielding performance of the first light shielding region 1. In the same viewpoint, it is more preferable that the visible transmittance is 20% or less. From the viewpoint of the light shielding performance, there is no problem as long as the visible transmittance is 0.1% or more. It is preferable that the visible transmittance is 10% or more in order to make refractive indexes and extinction coefficients of one main surface (back side) of the transparent substrate 4 and the first light shielding layer 5 approach each other so as to reduce reflectance from the first light shielding region 1, specifically reflectance $R_D$ which is described below.

The average transmittance at a wavelength of 800 to 1,000 nm of the first light shielding region 1 is 65% or more. When the average transmittance is 65% or more, light in a wavelength range of from 800 nm to 1,000 nm can be sufficiently transmitted in the first light shielding region 1. A typical sensor responds to light in the wavelength range of from 800 nm to 1,000 nm. Therefore, it is demanded to transmit light in the wavelength range. The average transmittance is preferably 75% or more, more preferably 80% or more, and further more preferably 85% or more. It is preferable that the average transmittance is higher in order to reduce loss of light in the wavelength range of from 800 nm to 1,000 nm, which is light in the wavelength that the sensor can receive in the first light shielding region 1. On the other hand, the upper limit of the average transmittance at the wavelength of 800 to 1,000 nm of the first light shielding region 1 is not particularly limited, but the average transmittance is preferably 95% or less.

(First Light Shielding Layer)

In the present embodiment, the first light shielding layer 5 constituting the first light shielding region 1 contains a material which transmits infrared rays (hereinafter referred to as infrared transmitting material). For example, the first light shielding layer 5 is formed by curing a resin composition containing an infrared transmitting material. In the following description, the resin composition for forming the first light shielding layer 5 is referred to as a first resin composition.

A pigment having an infrared transmitting property may be used as the infrared transmitting material. The pigment may be either an inorganic pigment or an organic pigment. Examples of such inorganic pigments include iron oxide, titanium oxide, a composite oxide based pigment, and the like. Examples of such organic pigments include a metal complex based pigment such as a phthalocyanine based pigment, an anthraquinone based pigment, an azo based pigment, and the like.

The content ratio of the infrared transmitting material in the first light shielding layer 5 may be desirably changed depending on desired optical characteristics. The content ratio is preferably 0.01 to 20 mass % as a ratio of the content of the infrared transmitting material to the total mass of the first light shielding layer 5. The content ratio can be achieved by adjusting the content ratio of the infrared transmitting material to the total mass of the first resin composition.

As for curing of the first resin composition, examples of curing include photo-curing, thermos-curing, curing by mixing two or more kinds of liquids, curing by drying a solvent, and the like.

Examples of resin components in the first resin composition include varnish (oil varnish and/or spirit varnish), paint resin, commodity plastic, engineering plastic, and the like. A material which is low in infrared absorption is preferred as the resin composition. Examples of such paint resins include acrylic resin, polyurethane resin, acrylic silicone resin, silicone resin, fluororesin, and the like. Examples of such commodity plastics or engineering plastics include ABS resin, polycarbonate resin, unsaturated polyester resin, polypropylene resin, modified PPO resin, polyamide resin, and the like.

The first resin composition may contain a solvent or a dispersion medium. Those materials are compounded suitably in the resin composition in order to improve workability in coating the transparent substrate with the resin composition.

The thickness of the first light shielding layer 5 is preferably 1 to 10 μm, and more preferably 2 to 5 μm. When the thickness of the first light shielding layer 5 is 1 μm or more, the transmittance can be prevented from being sensitized to a deviation of the thickness of the first light shielding layer 5. Thus, unevenness of the transmittance can be prevented. On the other hand, when the thickness of the first light shielding layer 5 is 10 μm or less, interlayer peeling caused by stress can be prevented. Thus, when the transparent substrate is laminated to a liquid crystal panel, an air line can be prevented from being generated in a step portion due to residual air.

It is preferable that the refractive index of the first light shielding layer 5 is a value close to the refractive index of the transparent substrate 4. A difference |n1−n2| between the refractive index n of the transparent substrate 4 and the refractive index n2 of the first light shielding layer 5 is preferably 0.3 or less, and more preferably 0.2 or less. When the difference falls within the range, reflectance of the second light shielding region 2 can be sufficiently lowered. The refractive index indicates a real part of the refractive index at a wavelength of 550 nm. For example, glass may be used as the transparent substrate.

(Second Light Shielding Region 2)

In the present embodiment, the second light shielding region 2 has an optical density of 4 or more. Accordingly, the light shielding performance of the second light shielding region 2 in the light shielding region 3 is high. There is a case where the transparent substrate 10 with a light shielding region in the present embodiment is used as a front plate of a display device, and a liquid crystal panel is used as a display panel which is a constituent member of the display device. In this case, a backlight is mounted on the back surface of the liquid crystal panel. When the optical density is 4 or more, a sufficient light shielding property can be ensured so that light from the backlight can be shielded sufficiently without leaking. Thus, visibility can be ensured in the display device. In order to enhance the light shielding performance of the light shielding region 3 in the transparent substrate 10 with a light shielding region, the optical density is preferably 4.2 or more, and more preferably 4.5 or more.

The optical density is an absolute value of a value in which a ratio of a transmitted light quantity Ta of light transmitted through a measurement target to an incident light quantity I of light incident is expressed by base-10 logarithm, and indicates degree of hiding performance. For example, when the incident light quantity I of visible light with a wavelength of 360 to 830 nm is 1,000 and the transmitted light quantity Ta is 1, the optical density at that time is expressed by $|Log_{10}(1/1000)|=3$. This can be measured by use of a black-and-while transmission densitometer (tradename: Ihac-T5, produced by Ihara Electronic Industries Co., Ltd.) or a glass substrate transmittance/reflectance measure unit (tradename: LV-RTM, produced by Lambda Vision Inc.).

In the present embodiment, the second light shielding region 2 has a visible reflectance of 0.1 to 1%, the visible reflectance being determined through measurement from the other main surface (front side) of the transparent substrate 4. The visible reflectance is a value in which surface reflection on the other main surface of the transparent substrate 4 has been excluded. The visible reflectance of the second light shielding region 2 can be determined by the method described in Examples.

The transparent substrate 10 with a light shielding region in the present embodiment is disposed in front of a display surface of a display panel, and the display panel or a sensor is provided on the back side of the light shielding region (the surface side provided with the light shielding layer). The display surface of the display panel or the sensor is typically black, and the average reflectance at a wavelength of 350 nm to 700 nm in those surfaces is about 1%.

In the present embodiment, a major part of light in the visible light region, which enters the first light shielding region from the front side of the transparent substrate, is absorbed by the first light shielding layer 5. Of the visible light region, light with a long wavelength is transmitted through the first light shielding layer 5. The light transmitted through the first light shielding layer 5 is reflected from the display surface of the display panel or the surface of the sensor, and the reflected light is transmitted again through the first light shielding layer 5. Thus, the first light shielding region 1 can be visually recognized by human eyes. On the other hand, in the second light shielding region 2, due to the existence of the first light shielding layer 5 and the second light shielding layer 6, any light in the visible light region cannot reach the display surface of the display panel or the sensor. Instead, light with a long wavelength is transmitted through the first light shielding layer 5 and reflected from the boundary between the first light shielding layer 5 and the second light shielding layer 6. When the reflectance of the light with the long wavelength of the visible light region in the second light shielding region 2 is much lower than the reflectance of the sensor surface or the like of the first light shielding region 1, a difference in hue (hereinafter referred to as color difference) occurs between the first light shielding region 1 and the second light shielding region 2 in the light shielding region 3.

In the transparent substrate 10 with a light shielding region in the present embodiment, there is a clear boundary between the first light shielding layer 5 and the second light shielding layer 6. Accordingly, reflection occurs between the first light shielding layer 5 and the second light shielding layer 6. As a result, in the second light shielding region 2 in the light shielding region 3, any light other than the light with the long wavelength of the visible light region cannot reach the display surface of the display panel or the sensor surface, while the light with the long wavelength of the visible light region is reflected between the first light shielding layer 5 and the second light shielding layer 6 and transmitted through the first light shielding layer 5.

When the transparent substrate 10 with a light shielding region is disposed on the front surface of the display panel, the color difference between the first light shielding region 1 and the second light shielding region 2 in the light shielding region 3 can be reduced when the degree of the reflection of the light with the long wavelength of the visible light region between the first light shielding layer 5 and the second light shielding layer 6 in the second light shielding region 2 is equal to or similar to the degree of the reflection of the light with the long wavelength of the visible light region in the light shielding region 3. Thus, the boundary between those regions cannot be visually recognized.

From the aforementioned viewpoint, the visible reflectance of the second light shielding region 2, determined through measurement from the front side of the transparent substrate 4, is more preferably 0.1 to 0.8%, and further more preferably 0.1 to 0.6%.

In addition, from the aforementioned viewpoint, in the present embodiment, the average reflectance $R_1$ at a wavelength of 600 to 700 nm, determined through measurement from the front side of the transparent substrate 4 of the second light shielding region 2, is 1.5 times or more of the average reflectance $R_2$ at a wavelength of 400 to 600 nm determined likewise. The average reflectance of the second light shielding region 2 is a value in which surface reflection on the transparent substrate 4 has been excluded.

In the present embodiment, the first light shielding layer 5 is high in transmittance with respect to light with a long wavelength of the visible light region, and low in transmittance with respect to light with a short wavelength of the same region. When the average reflectance $R_1$ at the wavelength of 600 to 700 nm of the second light shielding region 2 does not reach 1.5 times of the average reflectance $R_2$ at the wavelength of 400 to 600 nm of the second light shielding region 2, the quantity of light reflected from the second light shielding layer 6 and transmitted through the first light shielding layer 5 is reduced. Thus, in the light shielding region 3, the color difference between the first light shielding region 1 and the second light shielding region 2 is increased. Therefore, the average reflectance $R_1$ is preferably 2 times or more of the average reflectance $R_2$, and more preferably 2 to 10 times of the average reflectance $R_2$. When the average reflectance $R_1$ reaches 10 times or more, printing itself may be tinged with red, and thus, there may arise a problem in designability.

(Second Light Shielding Layer)

In the present embodiment, the second light shielding layer 6 is a layer in which the optical density of its stacked region (second light shielding region) which is a stack of the second light shielding layer 6 and the first light shielding layer 5 is 4 or more.

In order that the second light shielding layer 6 can satisfy the aforementioned properties, it is preferable that the second light shielding layer 6 has an optical density (OD value) of 2 or more when it is a single layer. In addition, a layer which does not transmit infrared rays is preferred as the second light shielding layer 6.

The second light shielding layer 6 is formed by curing a resin composition containing a coloring pigment which can absorb light in the visible light region. In the following description, the resin composition for forming the second light shielding layer 6 is referred to as a second resin composition.

Examples of such coloring pigments which can absorb light in the visible light region include a black material such as carbon black and titanium black, and a white material such as titanium oxide and zinc oxide. In addition, the coloring material is not limited to the aforementioned black material or white material, but a material having a desired color can be used.

The content ratio of the coloring pigment which can absorb light in the visible light region in the second light shielding layer 6 may be changed desirably depending on desired optical properties. The content ratio which is a ratio of the content of the coloring pigment which can absorb light in the visible light region to the total mass of the second light shielding layer 6 is preferably 0.01 to 20 mass %. The aforementioned content ratio can be achieved by adjusting the content ratio of the coloring pigment which can absorb light in the visible light region, to the total mass of the second resin composition.

As a resin component in the second resin composition, a resin component similar to the resin component in the resin composition for forming the first light shielding layer 5 can be used.

The resin composition for forming the second light shielding layer 6 may contain a solvent or a dispersion medium. Those materials are compounded suitably in the resin composition in order to improve workability in coating the transparent substrate with the resin composition.

The thickness of the second light shielding layer 6 is preferably 1 to 10 m, and more preferably 2 to 5 jam. When the thickness of the second light shielding layer 6 is 1 jam or more, the transmittance can be prevented from being sensitized to a deviation of the thickness of the second light shielding layer 6. Thus, unevenness of the transmittance can be prevented. On the other hand, when the thickness of the second light shielding layer 6 is 10 jam or less, interlayer peeling caused by stress can be prevented. Thus, when the transparent substrate is laminated to a liquid crystal panel, an air line can be prevented from being generated in a step portion due to residual air.

(Transparent Substrate)

In the present embodiment, the transparent substrate 4 serves as a front plate for protecting the display panel and the sensor. A glass plate, a resin plate, a laminated glass of 2 glass plates, a laminated plate of a glass plate and a resin plate, and the like may be used as the transparent substrate 4. Of them, the glass plate or the laminated glass is preferred in terms of excellent designability. In addition, the glass plate is preferred because the transparent substrate 4 can be made light or thin.

In the present embodiment, the glass plate may be a strengthened glass obtained by subjecting transparent and colorless soda lime glass or aluminosilicate glass ($SiO_2$—$Al_2O_3$—$Na_2O$ based glass) to strengthening treatment.

For example, the glass plate may be made of a glass material containing, expressed by mol % in terms of oxide, 50 to 80% of $SiO_2$, 1 to 20% of $Al_2O_3$, 6 to 20% of $Na_2O$, 0 to 11% of $K_2O$, 0 to 15% of MgO, 0 to 6% of CaO, and 0 to 5% of $ZrO_2$. Specifically, strengthened glass in which aluminosilicate glass has been subjected to strengthening treatment (for example, "Dragontrail®") can be used preferably.

It is preferable that a compressive stress layer has been formed in the surface of the glass plate. The thickness of the compressive stress layer is preferably 10 μm or more, more preferably 15 μm or more, further more preferably 25 μm or more, and particularly preferably 30 μm or more. In addition, surface compressive stress in the compressive stress layer is preferably 650 MPa or more, and more preferably 750 MPa or more.

As a method for forming the compressive stress layer in the glass plate, the following method may be used. That is, a glass plate is dipped in $KNO_3$ molten salt, thereby subjecting to an ion exchange process, and after that, the glass plate is cooled down to the vicinity of room temperature. The treatment conditions such as the temperature of the $KNO_3$ molten salt and the immersion time may be set so that the surface compressive stress and the thickness of the compressive stress layer can reach desired values.

The thickness of the transparent substrate 4 is preferably 0.3 to 2.5 mm. When the thickness is 0.3 mm or more, the strength of the transparent substrate 4 is sufficient to improve the shock resistance. On the other hand, when the thickness is 2.5 mm or less, the transparent substrate 4 is not too thick. Thus, for example, when a touch panel is disposed between the transparent substrate 4 and the display panel, the sensitivity of the touch panel can be prevented from lowering. The thickness of the transparent substrate 4 is more preferably 0.7 to 2.3 mm, and further more preferably 1 to 2 mm.

The outline shape and size of the transparent substrate 4 are determined suitably depending on the outline shape of the display panel. The outline shape of the display panel is typically an oblong such as a rectangle. Therefore, the outline shape of the transparent substrate 4 is also typically an oblong. The size of the transparent substrate 4 is larger than a display portion of the display panel. The size of the transparent substrate 4 is, for example, 100 to 800 mm in its longer side direction and 40 to 300 mm in its shorter side direction when it is an oblong.

The sectional shape of the transparent substrate 4 may be an oblong, or a shape which is curved partially.

(Surface Functional Layer)

In the present embodiment, a functional layer may be provided on/above a main surface of the transparent substrate 4. Examples of such functional layers include an antireflection layer, an antifouling layer, an antibacterial layer, an antiglare layer, and the like. The functional layers may be provided on/above the both main surfaces of the transparent substrate 4, or on/above only one of the main surfaces. Preferably the functional layers are provided on the front side of the transparent substrate 4 in order to enhance the display performance.

<Antireflection Layer>

The antireflection layer is a layer that is formed to prevent reflection of external light to thereby enhance the display quality of a displayed image.

When an antiglare layer is provided on a surface of the transparent substrate 4, it is preferable that an antireflection layer is formed on the antiglare layer. When an antifouling layer and an antireflection layer are provided on/above a surface of the transparent substrate 4, it is preferable that the antireflection layer and the antifouling layer are formed in this order from the transparent substrate 4 side.

The configuration of the antireflection layer is not particularly limited as long as it is a configuration by which reflection of light can be controlled within a predetermined range. For example, the antireflection layer may have a configuration in which a high refractive index layer and a low refractive index layer are stacked. Here, for example, the high refractive index layer is a layer having a refractive index of 1.9 or higher with respect to light having a wavelength of 550 nm, and the low refractive index layer is a layer having a refractive index of 1.6 or lower with respect to the light having the wavelength of 550 nm.

As for the number of high refractive index layers and the number of low refractive index layers in the antireflection layer, the antireflection layer may have a configuration including one high refractive index layer and one low refractive index layer, and the antireflection layer may have a configuration including two or more high refractive index layers and two or more low refractive index layers. In a case of the configuration including one high refractive index layer and one low refractive index layer, it is preferable that the high refractive index layer and the low refractive index layer are stacked in this order from the transparent substrate side, on/above a main surface of the transparent substrate. On the other hand, in a case of the configuration including two or more high refractive index layers and two or more low refractive index layers, it is preferable to form a stack in which the high refractive index layers and the low refractive index layers are stacked alternately in this order. The total number of layers in the stack is preferably 2 or more and 8 or less, more preferably 2 or more and 6 or less, and even more preferably 2 or more and 4 or less. In addition, another layer may be added as long as it does not spoil the optical property. For example, a $SiO_2$ film may be provided between the glass and the first layer in order to prevent diffusion of Na from the glass plate.

Materials of each high refractive index layer and each low refractive index layer are not particularly limited, and may be selected depending on a required degree of antireflection, or required productivity. Examples of the materials of the high refractive index layer include niobium oxide ($Nb_2O_5$), titanium oxide ($TiO_2$), zirconium oxide ($ZrO_2$), tantalum oxide ($Ta_2O_5$), aluminum oxide ($Al_2O_3$), silicon nitride (SiN), and the like. At least one kind selected from those materials can be preferably used. Examples of the materials of the low refractive index layer include silicon oxide (particularly silicon dioxide $SiO_2$), a material containing a mixed oxide of Si and Sn, a material containing a mixed oxide of Si and Zr, a material containing a mixed oxide of Si and Al, and the like. At least one kind selected from those materials can be preferably used.

The antireflection layer can be formed preferably by a method for forming an inorganic thin film directly on the surface, a method for performing surface treatment by etching or the like, a dry method such as a chemical vapor deposition (CVD) method or a physical vapor deposition (PVD) method, particularly by a vacuum deposition method or a sputtering method which is a kind of physical vapor deposition method.

The thickness of the antireflection layer is preferably 100 to 500 nm. It is preferable that the thickness of the antireflection layer is not less than 100 nm, so that reflection of external light can be effectively prevented.

<Antifouling Layer>

The antifouling layer has at least one property of oleophobicity and oleophilicity. The antifouling layer has a function of preventing adhesion of various kinds of dirt such as sweat or dust in addition to a fingerprint, making it easy to wipe away the dirt, or making the dirt inconspicuous, and the surface of the transparent substrate can be kept clean. In addition, finger slidability can be obtained so that a finger can slide smoothly when a touch panel is operated by the finger.

As a method for forming the antifouling layer, it is possible to use a vacuum deposition method (dry method) in which a fluorine-containing organic compound or the like is evaporated in a vacuum tank to be attached to the surface of the antireflection layer, a method (wet method) in which a fluorine-containing organic compound or the like is dissolved in an organic solvent, and the concentration thereof is adjusted to a predetermined composition, followed by applying it to the surface of the antireflection layer, and the like.

Examples of the dry method include an ion beam assist deposition method, an ion plate method, a sputtering method, a plasma CVD method, and the like. Examples of the wet method include a spin coat method, a dip coat method, a cast method, a slit coat method, a spray coat method, and the like. Both of the dry method and the wet method may be suitably used. From the viewpoint of abrasion resistance, it is preferred to use a dry deposition method.

A material of the antifouling layer may be suitably selected from fluorine-containing organic compounds and the like, which can provide an antifouling property, water repellency or oleophobicity. Specifically, a fluorine-containing organic silicon compound or a fluorine-containing hydrolyzable compound may be used. Any fluorine-containing organic compound can be used without particular limitation as long as it can provide the antifouling property, the water repellency or the oleophobicity.

When an antireflection layer is formed on a main surface of the transparent substrate or a treated surface of an antiglare layer, it is preferable that a coating film of the fluorine-containing organic silicon compound for forming the antifouling layer is formed on the surface of the antireflection layer. When a glass plate which is subjected to a surface treatment such as antiglare treatment or chemically strengthening treatment and on which the antireflection layer is not formed is used as the transparent substrate, it is preferable that the coating film of the fluorine-containing organic silicon compound is formed directly on the surface subjected to the surface treatment.

Examples of a method for forming a coating film of a fluorine-containing organic silicon compound include: a method in which a composition containing a silane coupling agent having a fluoroalkyl group such as a perfluoroalkyl group or a fluoroalkyl group including a perfluoro(polyoxyalkylene) chain is applied by a spin coat method, a dip coat method, a cast method, a slit coat method, a spray coat method or the like, and then heating treatment is performed; a vacuum deposition method in which a fluorine-containing organic silicon compound is vapor-deposited, and then heating treatment is performed; and the like. In order to obtain a coating film of the fluorine-containing organic silicon compound high in adhesion, it is preferable to form the coating film by the vacuum deposition method. When the coating film of the fluorine-containing organic silicon compound is formed by the vacuum deposition method, it is preferable to use a composition for forming a coating film which contains a fluorine-containing hydrolyzable silicon compound.

In the antifouling layer, the fluorine-containing hydrolyzable silicon compound used for forming the coating film of the fluorine-containing organic silicon compound is not particularly limited as long as the obtained coating film of the fluorine-containing organic silicon compound has an antifouling property such as water repellency or oleophobicity. Specifically, for example, a fluorine-containing hydrolyzable silicon compound containing at least one group selected from the group consisting of perfluoropolyether groups, perfluoroalkylene groups and perfluoroalkyl groups may be used.

The thickness of the antifouling layer is not particularly limited, and it is preferably 2 to 20 nm, more preferably 2 to 15 nm, and even more preferably 3 to 10 nm. When the thickness is 2 nm or more, the surface of the antireflection layer can be covered with the antifouling layer uniformly so that abrasion resistance can be ensured easily to withstand in practical use. On the other hand, when the thickness is 20 nm or less, optical properties such as visible reflectance and a haze value are excellent in the state where the antifouling layer has been stacked.

<Antiglare Layer>

An antiglare layer may be provided on/above a surface of the transparent substrate 4 in order to impart an antiglare property to the transparent substrate 4. The antiglare property is a function of mainly scattering reflected light to thereby reduce glare of the reflected light caused by reflection of a light source. In order to impart the antiglare property, a concave-convex shape may be formed in the surface of the transparent substrate 4.

A common method can be applied to the method for forming the concave-convex shape. When a glass substrate is used as the transparent substrate 4, it is possible to use a method in which a surface treatment is chemically or physically applied to the surface of the glass substrate to thereby form a concave-convex shape with desired surface roughness, a wet coat method, and the like.

Frosting may be used as a method for chemically performing antiglare treatment. The frosting can be performed in such a manner that the glass substrate as an object to be treated is dipped in a mixed solution of hydrogen fluoride and ammonium fluoride. As a method for physically performing antiglare treatment, it is, for example, possible to use a sandblasting process in which crystalline silicon dioxide powder, silicon carbide powder, or the like is blown toward the main surface of the glass substrate by pressurized air, a method in which the main surface of the glass substrate is rubbed with a brush attached with crystalline silicon dioxide powder, silicon carbide powder or the like, and soaked with water or the like.

In the surface of the transparent substrate 4 with the antiglare layer, the surface roughness (root mean square, RMS) is preferably 0.01 to 0.5 rpm. The surface roughness (RMS) is more preferably 0.01 to 0.3 μm, and even more preferably 0.02 to 0.2 μm. When the surface roughness (RMS) falls within the aforementioned range, a haze value of the transparent substrate with the antiglare layer can be adjusted to be 1% to 30%.

(Other Forms)

In the present invention, the numbers of light shielding layers in the first light shielding region and the second light shielding region are not limited. Instead of the aforementioned form, the first light shielding region may have two or more light shielding layers, and the second light shielding region may have three or more light shielding layers as shown in FIG. 2B. As the number of layers increases, the thickness can be increased. Pin holes (hole-like regions where no light shielding layer is formed in a part of the transparent substrate) which may be generated when a single layer is provided can be reduced. Thus, the light shielding performance can be improved.

On the other hand, from the standpoint of the manufacturing efficiency, when the number of layers increases, the manufacturing efficiency may be lowered. Therefore, the total number of light shielding layers is preferably 2 to 4, more preferably 2 to 3, and particularly preferably 2.

When the number of layers is increased in the first light shielding region, it is preferable to use the same material to form each of the first light shielding layers. When the number of layers is increased in the second light shielding region, it is preferable to use the same material to form each of the second light shielding layers.

In addition, in the present invention, a third light shielding region having a different light shielding property may be provided in addition to the second light shielding region, and another light shielding region may be further provided.

(Method for Manufacturing Transparent Substrate with Light Shielding Layer)

A method for manufacturing a transparent substrate with a light shielding region in the present embodiment is described.

The method for manufacturing a transparent substrate with a light shielding region includes a step of preparing a transparent substrate, a step of forming a first light shielding layer on one main surface of the transparent substrate, and a step of forming a second light shielding layer on a predetermined part of the first light shielding layer to thereby form a light shielding region, and the light shielding region includes a first light shielding region composed of the first light shielding layer, and a second light shielding region in which the first light shielding layer and the second light shielding layer are stacked.

In the present embodiment, the first light shielding layer and the second light shielding layer are formed by a method for printing a first or second resin composition, respectively. Examples of the printing method include a bar coating method, a reverse coating method, a gravure coating method, a die coating method, a roll coating method, a screen method, and an inkjet method. The screen method is preferred because printing can be performed easily and simply, printing can be performed on various kinds of base materials, and printing can be performed depending on the size of a base material.

(Step of Forming First Light Shielding Layer on One Main Surface of Transparent Substrate)

In this step, the first resin composition is applied to the transparent substrate by the aforementioned printing method, followed by drying to form the first light shielding layer. In the present embodiment, it is preferable to sufficiently dry the first light shielding layer. Here, the phrase "sufficiently dry" means a state where the first light shielding layer and the second light shielding layer have made up an optically clear boundary without mixing their inks to each other after the first resin composition has been applied.

In the background art, in order to improve interlayer adhesion, the second light shielding layer is typically applied before the first light shielding layer is sufficiently dried. In this case, since the second light shielding layer is applied before the first light shielding layer is sufficiently dried, materials of the first light shielding layer and the second light shielding layer are mixed in the vicinity of the boundary between the first light shielding layer and the second light shielding layer to thereby make the boundary unclear. Thus, the refractive index has a continuous variation in the stack direction. As a result, there is a fear that reflection may be prevented. On the other hand, in this step, it has been found that when the first light shielding layer is sufficiently dried, reflection of light with a long wavelength in the visible light region occurs in the interface between the first light shielding layer and the second light shielding layer.

In the present embodiment, when the first light shielding layer is formed, the first resin composition is selected so as to form a first light shielding region having a visible transmittance of 0.1 to 40% and an average transmittance at a wavelength of 800 to 1,000 nm of 65% or more.

(Step of Forming Second Light Shielding Layer)

Next, the second resin composition is applied to a predetermined region of the first light shielding layer by the aforementioned printing method, followed by drying to form the second light shielding layer. Till then, the first light shielding layer has been sufficiently dried, and thus, in the stacked region, the first resin composition and the second resin composition are hardly transferred from each layer to the other. Since the resin composition in each layer is not transferred to the other layer, the boundary between the first light shielding layer and the second light shielding layer becomes clear. As a result, the visible reflectance of the second light shielding region where the first light shielding layer and the second light shielding layer have been stacked can be set to 0.1 to 1%, and the average reflectance $R_1$ at a wavelength of 600 to 700 nm can be 1.5 times or more of the average reflectance $R_2$ at a wavelength of 400 to 600 nm, the visible reflectance, the average reflectance $R_1$ and the average reflectance $R_2$ being determined through measurement from the other main surface (front side) of the transparent substrate and determined after excluding the surface reflection on the other main surface.

In the present embodiment, when the second light shielding layer is formed, the second resin composition is selected so as to form the second light shielding region having an optical density of 4 or more.

(Step of Forming Another Light Shielding Layer)

When the transparent substrate with a light shielding region is manufactured, a step of further forming another light shielding layer on the second light shielding layer may be provided. As a result, the light shielding performance of the light shielding layers can be enhanced.

(Step of Forming Surface Functional Layer)

When the transparent substrate with a light shielding region is manufactured, a step of forming a surface functional layer may be provided before or after the step of preparing the transparent substrate or after the step of forming the light shielding layer on one main surface of the transparent substrate.

Due to this step, the transparent substrate with a light shielding layer, including the surface functional layer, can be obtained.

(Display Device Including Transparent Substrate with Light Shielding Region)

The transparent substrate 10 with a light shielding region in the present invention may be used as a front plate (or a cover member) of a display panel.

A display device 20 in the present embodiment is described with reference to the sectional view of FIG. 3. The display device 20 in the present embodiment includes a display panel 11, a sensor 12 for receiving infrared rays, and a housing 14 for holding the display panel. In the display device 20 in the present embodiment, the transparent substrate 10 with a light shielding region and a display surface of the display panel 11 are integrated with each other through an adhesive layer 13. The adhesive layer 13 is not essential in the display device.

In the display device 20 in the present embodiment, the transparent substrate 10 with a light shielding region includes a region which can transmit infrared rays in the first light shielding region 1 of the light shielding region 3. Accordingly, the sensor 12 that receives infrared rays is disposed on the back surface of the first light shielding region of the transparent substrate 10 with a light shielding region.

Examples of the display panel 11 include a liquid crystal display panel, an organic EL display panel, and the like. In addition, in the display device 20 in the present embodiment, the transparent substrate 10 with a light shielding region may be assembled in the housing 14.

Examples of the adhesive layer 13 used for attaching the transparent substrate 10 with a light shielding region to the display surface of the display panel 11 include an optical transparent adhesive, an optical adhesive film, and the like. Examples of the transparent adhesive or adhesive film include a thermosetting resin composition and a photocurable resin composition. In addition, examples of those resin compositions include an acrylic material, a silicone material, an epoxy material, and the like.

The thickness of the adhesive film or the cured transparent adhesive is preferably 5 m or more and 400 μm or less, and more preferably 50 am or more and 200 μm or less. In addition, the storage shear elastic modulus of the adhesive film or the cured transparent adhesive is preferably 5 kPa or more and 5 MPa or less, and more preferably 1 MPa or more and 5 MPa or less.

Figure 3:
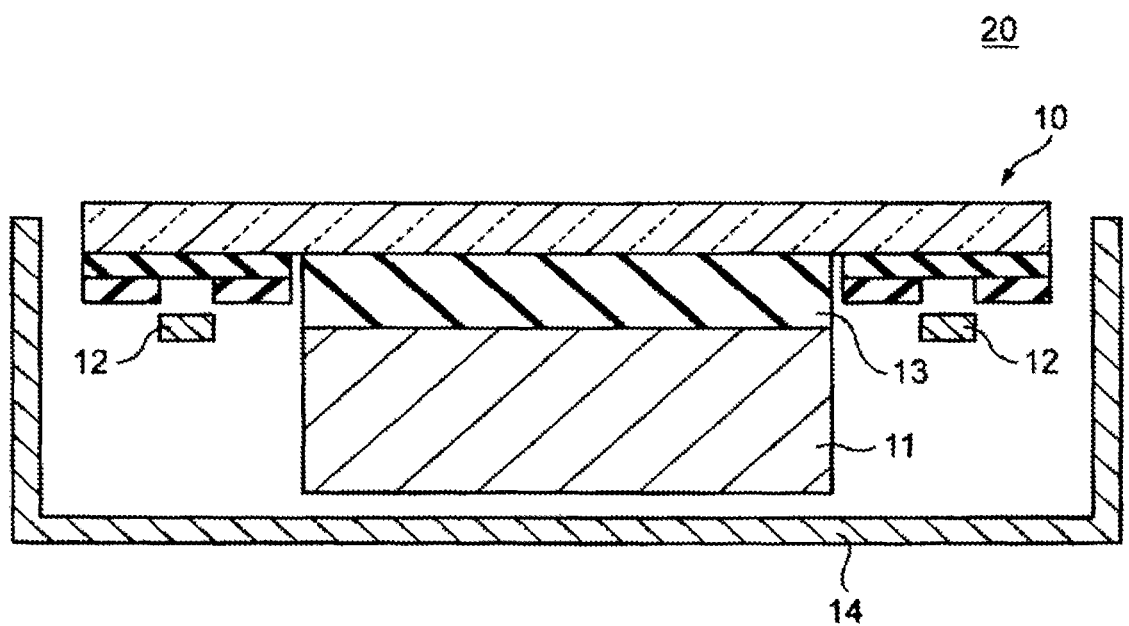
FIG. 3 is a sectional view of a display device in the present embodiment.

Although there is a space between the sensor 12 and the transparent substrate 10 with a light shielding region in the configuration in FIG. 3, the present invention is not limited thereto. For example, the sensor 12 may be placed through an adhesive layer in the same manner as the display panel 11. In this case, a material having the aforementioned characteristics may be used as the adhesive layer.

When the display panel 11 is a liquid crystal panel, a backlight module is further provided in the housing 14. The backlight module includes a backlight, and, if necessary, a diffuser panel or a light guide plate for making the backlight adequately functional.

The display device 20 in the present embodiment may include a touch sensor (not shown) or the like on the display surface side of the display panel 11. The touch sensor is stacked through an optical transparent adhesive or an optical adhesive film so as to be disposed on the main surface of the transparent substrate 10 with a light shielding region, the main surface being on the side where the light shielding region is provided. In addition, a display panel (for example, called an in-cell type) including a touch sensor in the display panel itself may be used as the display panel 11.

EXAMPLES

The present invention is described below specifically with reference to Examples. However, the present invention should not be interpreted to be limited to those Examples.

Each transparent substrate with a light shielding region was manufactured in the following procedure. A glass plate (tradename: Dragontrail (registered trademark), produced by AGC Inc.) was used as the transparent substrate.

Example 1

Step 1: Step of First Light Shielding Layer

A first resin composition (tradename: HF GV3 RX01 IR ink, produced by Seiko advance Ltd.) was applied to an outer peripheral portion of one main surface of the glass plate having a rectangular shape having a size of 15 cm×25 cm and having a thickness of 1 mm, by use of a screen printing plate. The first resin composition was dried at 150° C. for 60 minutes, thereby forming a first light shielding layer. The thickness of the first light shielding layer was 3 μm.

Step 2: Step of Forming Second Light Shielding Layer

A second resin composition (tradename: HF GV3 RX01 710, produced by Seiko advance Ltd.) was applied onto the first light shielding layer by use of a screen printing plate. The second resin composition was dried at 150° C. for 60 minutes, thereby forming a second light shielding layer. The second resin composition was applied so that a region where the second light shielding layer was not provided could be formed on the first light shielding layer, as shown in FIG. 1. The thickness of the second light shielding layer was 3 μm.

Figure 2A:
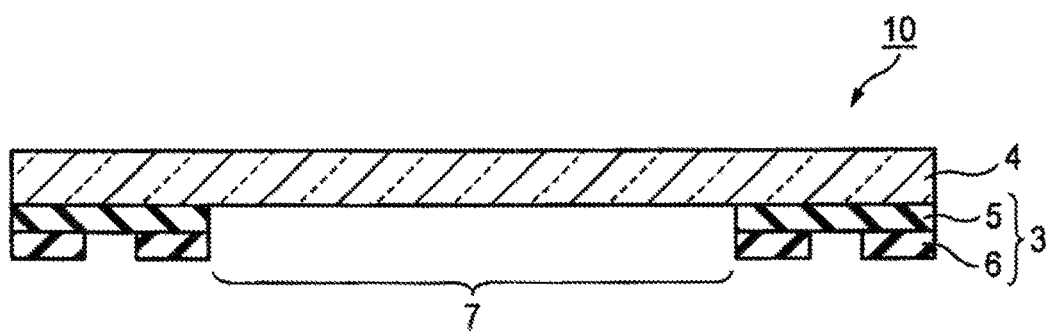
FIG. 2A is a sectional view of the transparent substrate with a light shielding region in the present embodiment, taken on line A-A.
Figure 2B:
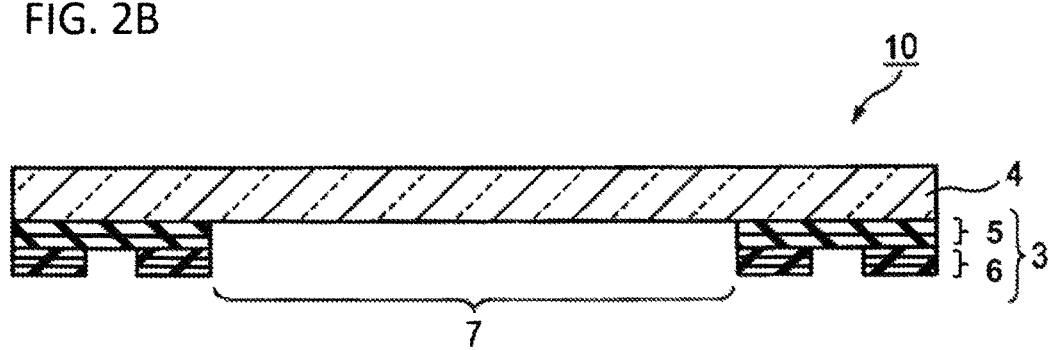
FIG. 2B is a sectional view of the transparent substrate with a light shielding region taken on line A-A in another embodiment.

Due to those steps, a glass plate with a light shielding region including a first light shielding region composed of the first light shielding layer and a second light shielding region where the first light shielding layer and the second light shielding layer had been stacked on one main surface of the glass plate was obtained, as shown in FIG. 2A.

Example 2

A glass plate with a light shielding region was obtained in the same manner as in Example 1, except that a first resin composition (tradename: IRX HF 40512, produced by Teikoku Printing Inks Mfg. Co., Ltd.) was used in Step 1.

Example 3

A glass plate with a light shielding region was obtained in the same manner as in Example 1, except that a first resin composition (tradename: IRX-HF 40552, produced by Teikoku Printing Inks Mfg. Co., Ltd.) was used in Step 1.
<Comparative 1>
A glass plate with a light shielding region was obtained in the same manner as in Example 1, except that the time for drying after the first resin composition was applied was reduced to 10 minutes.

Each glass plate with a light shielding region manufactured was evaluated with respect to the following items. The results of the evaluation are shown in Table 1.
(Visible Transmittance of First Light Shielding Region)
Visible transmittance was measured in a wavelength range of from 380 nm to 780 nm with respect to the first light shielding region composed of the first light shielding layer.

The visible transmittance was measured by use of an ultraviolet/visible/near infrared spectrophotometer (tradename: Solid Spec 3700, produced by Shimadzu Corporation). The measurement was performed at a wavelength interval of 5 nm.
(Average Transmittance in Infrared Region of First Light Shielding Region)
Average transmittance in a wavelength range of from 800 nm to 1,000 nm of the first light shielding region was measured. The average transmittance was measured by use of the ultraviolet/visible/near infrared spectrophotometer (tradename: Solid Spec 3700, produced by Shimadzu Corporation). The measurement was performed at a wavelength interval of 5 nm.
(Optical Density of Second Light Shielding Region)
Optical density of the second light shielding region where the first light shielding layer and the second light shielding layer had been stacked was measured. The optical density was measured by use of a black-and-while transmission densitometer (tradename: Ihac-T5, produced by IHARA Corporation).
(Visible Reflectance of Second Light Shielding Region)
Visible reflectance in a wavelength range of from 360 nm to 740 nm of the second light shielding region was measured. Spectral reflectance of the second light shielding region on the main surface of the glass plate where the light shielding layer was provided was measured in an SCI (Specular Component Include) mode by use of a spectral colorimeter (tradename: CM-2600d, produced by Konica Minolta Japan, Inc.). From the measured spectral reflectance, visible reflectance [a stimulus value Y of reflection defined in JIS Z 8701 (1999)] was obtained. This value was set as the visible reflectance of the second light shielding region. The visible reflectance was calculated by using the wavelength interval of 10 nm and a light source of D65 light source. The visible reflectance is usually measured in a wavelength range of from 380 nm to 780 nm. However, the measured results in the wavelength range of from 360 nm to 740 nm were used instead because it was confirmed that there was no difference.

(Reflectance Ratio of Second Light Shielding Region)

Average reflectance $R_2$ in a wavelength range of from 400 nm to 600 nm of the second light shielding region and average reflectance $R_1$ in a wavelength range of from 600 nm to 700 nm of the second light shielding region were measured. A reflectance ratio was calculated as a ratio of $R_1$ to $R_2$. Each reflectance was measured in the SCI mode by use of the spectral colorimeter (tradename: CM-2600d, produced by Konica Minolta Japan, Inc.) in the same manner as the case where the visible reflectance was measured. The wavelength interval was 10 nm.

The visible reflectance and average reflectance of the second light shielding region were calculated by use of the following approaches (1) and (2).

(1) Reflectance measured in a light transmitting region in the other main surface (front side) of the transparent substrate is regarded as reflectance $R_A$. Light determined as the reflectance $R_A$ includes light reflected from the surface of the transparent substrate, and light which passes through the inside of the transparent substrate, is reflected between the transparent substrate and air on the back side and is emitted again from the surface of the transparent substrate. When no antireflection film is provided on the surface of the transparent substrate, reflectance in the surface of the transparent substrate is equal to reflectance between the transparent substrate and the air on the back side, and the value of these reflectances is regarded as reflectance $R_n$. In this case, the following relationship is satisfied between the reflectance $R_A$ and the reflectance $R_B$. The reflectance $R_B$ is calculated from a value of the reflectance $R_A$ obtained as an analysis value and the following equation.

$$\text{reflectance } R_A = \text{reflectance } R_B + \text{reflectance } R_B(1-\text{reflectance } R_B)^2$$

(2) Further, reflectance of the second light shielding region determined through measurement from the aforementioned other main surface side of the transparent substrate, the aforementioned other main surface side having no light shielding layer formed, is regarded as reflectance $R_C$. In addition, reflectance in the interface between the light shielding layer and the transparent substrate in the second light shielding region is regarded as reflectance $R_D$. Light regarding the reflectance $R_D$ includes light reflected from the boundary surface between the transparent substrate and the first light shielding layer, and light reflected from the boundary surface between the first light shielding layer and the second light shielding layer. The reflectance $R_B$, the reflectance $R_C$ and the reflectance $R_D$ satisfy the following relationship. The reflectance $R_D$ is calculated from the reflectance $R_B$ obtained in the aforementioned manner, and the reflectance $R_C$ obtained as an analysis value. The reflectance $R_D$ is designated as a reflectance of the second light shielding region.

$$\text{reflectance } R_C = \text{reflectance } R_B + \text{reflectance } R_D(1-\text{reflectance } R_D)^2$$

(Visibility of Boundary Portion)

Visibility of a boundary portion between the first light shielding region and the second light shielding region in the light shielding layer was evaluated. A glass plate with a light shielding layer was disposed on a black plate. When the boundary between the regions in the light shielding layer could not been visually recognized clearly, the glass plate with a light shielding layer was evaluated as good. When the boundary could be visually recognized clearly, the glass plate with a light shielding layer was evaluated as not good.

TABLE 1

|  | Example 1 | Example 2 | Example 3 | Comparative Example 1 |
|---|---|---|---|---|
| Visible transmittance of first light shielding region | 25% | 30% | 1.2% | 25% |
| Average transmittance of infrared rays of first light shielding region | 82% | 85% | 76% | 82% |
| Optical density of second light shielding region | 4.2 | 4.4 | 4.3 | 4.2 |
| Visible reflectance of second light shielding region | 0.15% | 0.6% | 0.3% | 0.15% |
| Reflectance ratio of second light shielding region | 2.1 | 3.5 | 6.4 | 1.2 |
| Visibility of boundary portion (color difference) | good | good | good | not good |

In Examples 1 to 3 where the reflectance ratio of the second light shielding region was 1.5 or more, the color difference between the first light shielding region and the second light shielding region was small, and thus, the visibility of the boundary portion was low. On the other hand, in Comparative 1 where the reflectance ratio of the second light shielding region was less than 1.5, the boundary portion was distinguished clearly.

In the light shielding region, there is a boundary between the first light shielding region and the second light shielding region. Here, the first light shielding layer in each of Examples 1 and 2 and Comparative 1 has a transmittance of about 30% in the visible region. The transmittance increases at a wavelength of 600 to 700 nm, and light is further transmitted in the infrared region having a wavelength of 800 nm or more. In the first light shielding region, a part of light transmitted through the first light shielding layer is reflected from the surface of the black plate on which the glass plate with a light shielding region is placed.

In Examples 1 to 3, the drying time was made enough long after the first resin composition was applied. Accordingly, the refractive index between the first light shielding layer and the second light shielding layer could be made discontinuous. In the second light shielding region, a part of light transmitted through the first light shielding layer was reflected from the interface between the first light shielding layer and the second light shielding layer. As a result, it can be considered that reflection of external light from the first light shielding region became equal to that from the second light shielding region when the glass plate with a light shielding layer was placed on the black plate. Thus, it can be considered that the boundary was hardly visually recognized due to no difference in hue between those regions.

On the other hand, in Comparative 1, the drying time was short after the first resin composition was applied, as in the background art. Therefore, in a region corresponding to the second light shielding region, it can be considered that the first resin composition and the second resin composition were transferred from one layer to the other layer, causing mixture between the layers. Thus, it can be considered that no difference in refractive index occurred in the boundary between the first light shielding layer and the second light shielding layer, and the refractive index changed continuously to prevent reflection from the interface between those layers. As a result, it can be considered that when the glass plate with a light shielding region was placed on the black plate, reflection of external light from a region corresponding to the first light shielding region was not equal to that from the region corresponding to the second light shielding region, so that the boundary could be visually recognized easily.

Although the present invention is described in detail with reference to its specific embodiments, it is obvious for those skilled in the art that various changes and modifications can be made on the invention without departing from the spirit and scope of the invention. The present application is based on Japanese patent application No. 2016-238840 filed on Dec. 8, 2016, all the contents of which are incorporated herein by reference. In addition, all the references cited herein are incorporated as a whole.

INDUSTRIAL APPLICABILITY

The present invention is applicable as a cover glass of a display panel.

REFERENCE SIGNS LIST

1 First light shielding region
2 Second light shielding region
3 Light shielding region
4 Transparent substrate
5 First light shielding layer
6 Second light shielding layer
7 Light transmitting region
10 Transparent substrate with light shielding region
11 Display panel
12 Sensor
14 Housing
20 Display device

The invention claimed is:

1. A transparent substrate with a light shielding region, comprising:
a transparent substrate;
a first light shielding layer formed on a peripheral portion of a first main surface of the transparent substrate such that the first light shielding layer forms a first light shielding region on the peripheral portion of the first main surface of the transparent substrate; and
a second light shielding layer formed on a portion of the first light shielding layer such that a stack of the first and second light shielding layers forms at least one second light shielding region in the first light shielding region on the first main surface of the transparent substrate,
wherein the first light shielding layer is formed such that the first light shielding region has a luminous transmittance of 0.1 to 40%, and an average transmittance at a wavelength of 800 to 1,000 nm of 65% or more, where the luminous transmittance and the average transmittance are determined through measurement from a second main surface of the transparent substrate on an opposite side with respect to the first main surface, and the stack of the first and second light shielding layers is formed such that the second light shielding region has an optical density of 4 or more, a luminous reflectance of 0.1 to 1%, and an average reflectance R1 at a wavelength of 600 to 700 nm being 1.5 times or more of an average reflectance R2 at a wavelength of 400 to 600 nm, where the luminous reflectance, the average reflectance R1 and the average reflectance R2 are determined through measurement from the second main surface of the transparent substrate and are determined after excluding surface reflection on the second main surface of the transparent substrate.

2. The transparent substrate according to claim 1, wherein the first light shielding layer comprises a plurality of light shielding layers.

3. The transparent substrate according to claim 1, wherein the second light shielding layer comprises a plurality of light shielding layers.

4. The transparent substrate according to claim 2, wherein the first light shielding layer includes a pigment which transmits infrared rays.

5. The transparent substrate according to claim 1, wherein the first light shielding region and the second light shielding region form a light shielding region such that a ratio of an area of the first light shielding region to an area of the light shielding region is 5 to 40%.

6. The transparent substrate according to claim 1, further comprising:
a surface functional layer formed on/above the second main surface of the transparent substrate.

7. The transparent substrate according to claim 6, wherein the surface functional layer is at least one selected from the group consisting of an antireflection layer, an antiglare layer, and an antifouling layer.

8. The transparent substrate according to claim 1, wherein the transparent substrate is a glass plate.

9. A display device, comprising:
the transparent substrate of claim 1;
a display panel adhered on the transparent substrate;
a sensor positioned to receive infrared rays in the first light shielding region of the transparent substrate; and
a housing accommodating the transparent substrate, the display panel and the sensor.

10. The display device according to claim 9, wherein the display panel is a liquid crystal panel.

11. The transparent substrate according to claim 1, wherein the first light shielding layer comprises resin and a pigment.

12. The transparent substrate according to claim 1, wherein the second light shielding layer comprises resin and a pigment.

13. The transparent substrate according to claim 1, wherein the second light shielding layer comprises a plurality of light shielding layers.

14. The transparent substrate according to claim 1, wherein the first light shielding layer includes a pigment which transmits infrared rays.

15. The transparent substrate according to claim 2, wherein the first light shielding region and the second light shielding region form a light shielding region such that a ratio of an area of the first light shielding region to an area of the light shielding region is 5 to 40%.

16. The transparent substrate according to claim 5, further comprising:
    a surface functional layer formed on/above the second main surface of the transparent substrate.

17. The transparent substrate according to claim 16, wherein the surface functional layer is at least one selected from the group consisting of an antireflection layer, an antiglare layer, and an antifouling layer.

18. The transparent substrate according to claim 5, wherein the transparent substrate is a glass plate.

19. The transparent substrate according to claim 1, wherein the first light shielding layer comprises resin and a pigment which transmits infrared rays.

20. The transparent substrate according to claim 19, wherein the second light shielding layer comprises resin and a coloring pigment which absorbs light in a visible light region.

* * * * *